Jan. 23, 1962            W. WITT            3,017,802
OPTICAL APPARATUS FOR DETECTING SUBSTANCES IN FLUIDS
Filed July 10, 1959
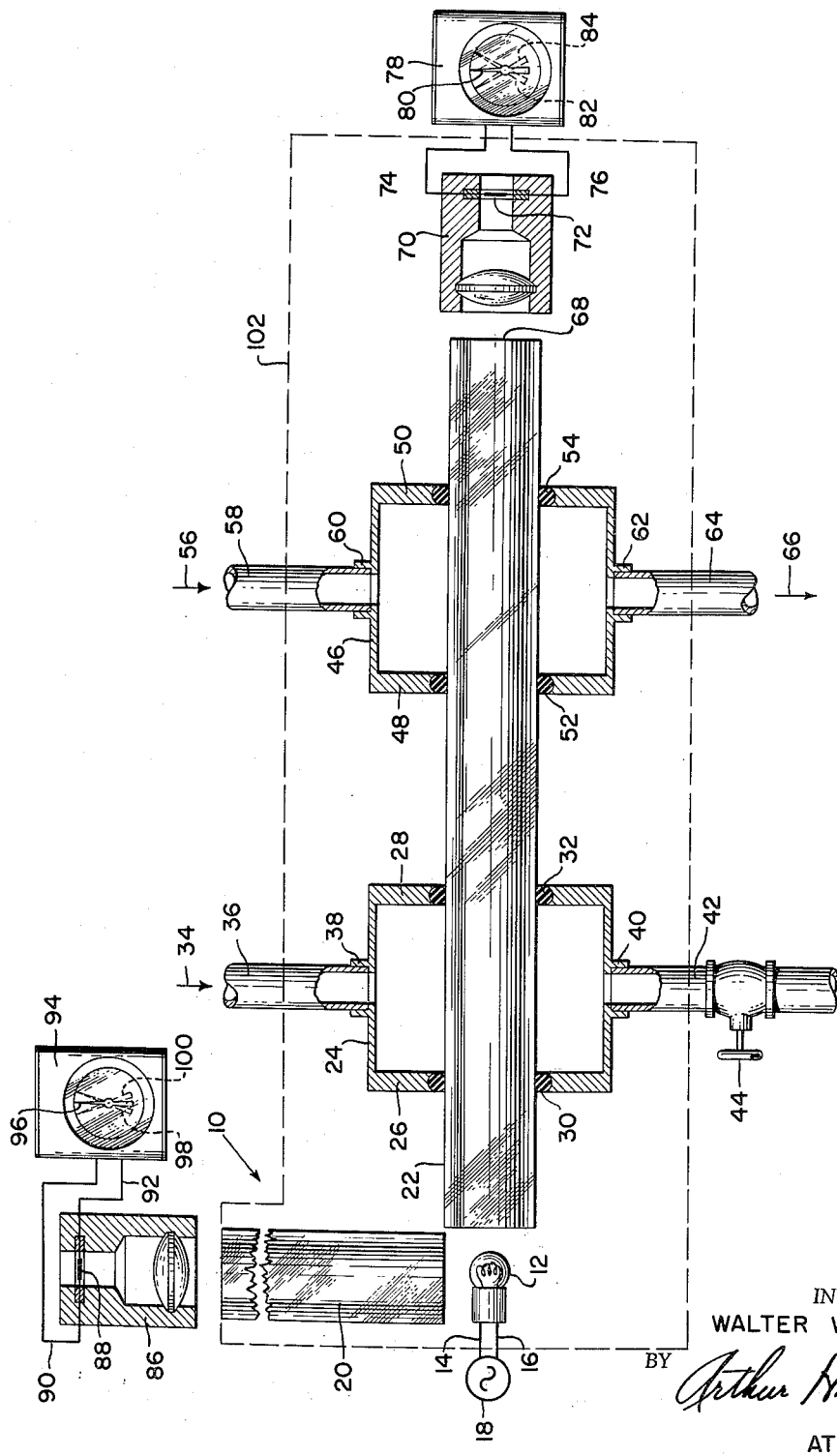
INVENTOR.
WALTER WITT
BY Arthur H. Swanson
ATTORNEY.

United States Patent Office 3,017,802
Patented Jan. 23, 1962

3,017,802
OPTICAL APPARATUS FOR DETECTING
SUBSTANCES IN FLUIDS
Walter Witt, Philadelphia, Pa., assignor to Minneapolis-
Honeywell Regulator Company, Minneapolis, Minn., a
corporation of Delaware
Filed July 10, 1959, Ser. No. 826,232
11 Claims. (Cl. 88—14)

This invention relates to an analytical measuring apparatus that is useful in detecting the presence of one or more undesirable substances in a solution.

More specifically it relates to a measuring apparatus for continuously and automatically indicating whether or not the purity of fluids flowing through process lines are within certain preselected quality control limits.

It is thus a more specific primary object of the present invention to disclose a measuring apparatus of the aforementioned type which will immediately detect and indicate the presence of any undesirable substance in fluids flowing through process lines.

It is still another object of the invention to provide a radiant energy transmitting apparatus having an indicator that will remain in a substantially 12 o'clock position only as long as the fluid flowing through a process possesses a predetermined normal dispersion characteristic and/or certain strong absorption bands in regions of anomalous dispersion and which will immediately move away from this 12 o'clock position whenever the fluid being measured deviates from the aforementioned predetermined characteristics.

This application along with the James Vollmer et al. United States patent application Serial Number 753,570 filed on August 6, 1958, and which is assigned to the same assignee, each measures the index of refraction and absorption characteristics of a substance surrounding a radiant energy guide or rod member. Although this application and the aforementioned referred to application of James Vollmer et al. discloses certain common principles upon which characteristic measurements of substances may be acquired this application differs from that of the Vollmer et al. application in that it discloses both a fluid retaining test chamber and fluid retaining reference chamber positioned around a single radiant energy transmitting rod through the use of which the presence of certain preselected undesirable substances can readily be detected. The Vollmer et al. application, on the other hand, discloses a radiant energy transmitting guide which is particularly adapted to measure the specific gravity and/or composition of a fluid.

A still more specific object of the present invention is to provide an inexpensive apparatus that will instantaneously detect the presence of an infinitesimal amount of an undesirable fluid such as water in a reflux flow line of, for example, a distillation process through which alcohol is passing in which process the alcohol being produced must be rigidly maintained at a predetermined pure strength or proof in order to place it in a marketable condition for sale.

It is still a more specific object of the present invention to disclose a water detecting and indicating apparatus that is comprised of a radiant energy transmitting guide which is surrounded on one of its outer peripheral surfaces by a first reference fluid medium and on another adjacent surface by a second test fluid medium which is similar to the first medium but which may possess on occasion certain extraneous substances such as water.

Another object of the present invention is to provide an operator that is controlling a manufacturing process with an apparatus that will enable him to detect the presence of strong absorption bands which bands are caused by an undesired amount of impure substances entering the fluid which is being produced by this process.

Another object of the present invention is to provide an operator of a jet plane that is being flown under very high altitude low temperature conditions with an apparatus which will indicate to him when minute amounts of $H_2O$ or an excessive amount of additive such as boron is present in the jet fuel that is flowing to his jet engine combustion chamber.

In the single view shown in the drawing there is disclosed a fluid impurity detecting apparatus which is generally designated as reference number 10. This apparatus comprises an electromagnetic energy source which is schematically indicated as a light source 12 which derives its electrical energy by way of the conductors 14, 16 from a power source 18. The source of energy is arranged to provide radiant energy over a wide band of frequencies including strong bands in the anomalous dispersion region. Positioned immediately above the light source 12 there is a reference guide in the form of a radiant energy transmission guide 20 made of transparent light transmitting material such as, for example, sapphire. In alignment with the light source and immediately to the right of the light source 12 there is shown the left end of a radiant energy transmitting guide 22. Located along the length of the guide 22 and surrounding this guide there is disclosed in cross-section a jacket 24 whose side walls 26, 28 are separated from the guide by means of O-rings 30, 32. The walls 26, 28 of the jacket 24 are fixedly supported in such a manner that the only function of the O-rings 30, 32 will be to engage the outer surface of the guide 22 in a pencil-ring-shape contact manner so as to seal off the guide portion that extends between the walls 26, 28 from the main portion of the guide.

A reference fluid such as alcohol of a preselected standard pure strength or proof from a supply source, not shown, is poured in the direction of the arrow 34 through conduit 36 into the jacket 24 by way of an inlet port 38 formed in the peripheral wall of the jacket 24 and then out of the jacket by way of outlet port 40 and through a drain conduit 42 which has a valve 44 which closes off the flow of this fluid from the lower end of drain conduit 42. The valve 44 is moved to its open position for draining purposes when the apparatus is not in use or when it is desired to replace the reference fluid in chamber 24 with a new reference fluid.

Located adjacent to right end of the guide 22 there is also disclosed in cross section a second jacket 46 whose side walls 48, 50 are separated from the guide 22 by means of O-rings 52, 54. The walls 48, 50 of the jacket 46 are fixedly supported in such a manner that the only function of the O-rings 52, 54 will be to engage the outer surface of the guide 22 in a pencil-ring shaped contact manner so as to seal off the walls 48, 50 from the remaining portion of the guide.

A fluid from a flow line, not shown, whose purity is to be detected by the apparatus shown in the drawing flows in the direction of the arrow 56 by way of conduit 58, inlet port 60 into the jacket 46 and then out of the jacket by way of outlet port 62, and conduit 64 fixedly connected thereto in the direction of the arrow 66 and thence into another branch of the flow line.

The right end 68 of the guide 22 is directly in front of and spaced slightly to the left of the thermopile 70. Specifically, the thermopile is basically a thermopile of the type which is disclosed and claimed in the Harrison et al. Patent 2,357,193 and is in extensive commercial use in radiation pyrometers manufactured and sold by applicant's assignee.

The light sensing element 72 of the thermopile 70 is connected by way of conductors 74, 76 to a meter 78 calibrated to indicate when the impurity of the flowing fluid exceeds a preselected limit. The meter 78 is of a well known self balancing null type such as that which is disclosed in the Wills Patent 2,423,540 filed December 1, 1941, issued July 8, 1947.

The meter 78 is shown having a pointer 80 in a 12 o'clock or a zero fluid impurity reading position for the fluid passing through the jacket 46. A second position 82 for this pointer is shown located at a position that is clockwise and to the right of the aforementioned 12 o'clock position. This indicating position is representative of a position that the pointer would be moved to if the intensity of the light source 12 was increased. A third position 84 is also disclosed for the pointer which is shown located at a position that is counter clockwise and to the left of the 12 o'clock position noted supra. This third position, as will be explained in detail later, is representative of a position that the pointer would be moved to in the event that the impurity in the jacket exceeds a predetermined quality control limit.

In a similar manner to the connection just described a light sensing element 86 of a second thermopile 88 is connected by way of conduits 90, 92 to a meter 94 calibrated to maintain its pointer 96 in a 12 o'clock position except upon an increase or decrease in the intensity of the light source 12. When an increase in the light source 12 occurs the pointer will be moved clockwise to, for example, the dotted line position identified by reference 98. If, on the other hand, a decrease in the light source 12 should occur then the pointer will be moved counter clockwise to, for example, the dotted line position identified by reference number 100.

The drawing also shows schematically an enclosure 102 entirely encompassing most of the component parts so far described so that stray light or any foreign matter from any external source will be prevented in coming in contact with, for example, any unprotected peripheral wall portion of the radiant energy transmitting guides 20, 22.

In order to calibrate the aforementioned described impurity detector the jackets 24 and 46 are first filled with a reference sample of a fluid, for example, alcohol whose purity is to be maintained. The radiant energy from the light source 12 is then allowed to simultaneously pass through the left end of the guide 22 and up through the lower end of the guide 20. This radiant energy then passes out the other end of each of the guides 20, 22 to their respective thermopile detectors 72 and 78. Under this condition each of the pointers 80, 96 of the meters 78, 94 are then calibrated so that their respective pointers will be in their null or 12 o'clock position.

Experimental results from tests has shown that should this detector after it has been calibrated in the aforementioned manner be placed "on stream" or in other words connected so that the fluid being produced by a continuous process passes through the jacket 46 any impurity in this process fluid such as water will strongly absorb certain bands of radiant energy which loss in energy will cause the pointer that was previously in a 12 o'clock position to be moved counter clockwise to the position identified by reference numeral 84.

If, for example, strong frequency bands of energy $f_1$–$f_4$ are transmitted by the light source 12 into the left end of the guide 22 then certain of these frequencies, for example, $f_2$–$f_3$ will be absorbed by the reference fluid in jacket 24 as the bands of radiant energy transmitted through the guide 22 pass through the portion of the guide that is between the side walls 26, 28 of the jacket 24.

If the flowing process fluid under test in jacket 46 is of substantially the same purity as that of the reference fluid in jacket 24 then the position of the pointer of meter 78 will not move away from its 12 o'clock position as the bands of radiant energy being transmitted through the guide pass through the portion of the guide that is between the side walls 48 and 50 of the jacket 46. This is because the fluid in both jackets 24 and 46 absorb the same identical bands of radiant energy that is being transmitted through the guide.

On the other hand, should something go wrong with the manufacturing process which causes an undesired impurity such as water to be introduced into the process fluid that is passing through the jacket 46 then the water in this fluid will absorb, for example, strong absorption bands of energy $f_4$ which the reference fluid in the jacket 26 referred to supra did not absorb.

It can thus be seen that when the fluid under test that is passing through the jacket 46 contains water or other similar undesirable impure substances that the amount of radiant energy which the guide 22 can transmit past such a fluid to the meter 78 will be greatly reduced and hence cause the pointer of the meter 78 to move from its solid line or 12 o'clock position 80 counter clockwise to a position such as is identified in the drawing by reference numeral 84. The apparatus disclosed thus affords a way of instantaneously and continuously detecting the presence of an undesired impurity such as water in a continuously flowing process fluid, for example, alcohol.

Another application in which the apparatus describes supra is useful, is in its ability to detect when an undesirable amount of additive such as boron has inadvertently been added to a flow line that is transmitting jet fuel to a jet engine of, for example, a jet airplane, a missile or rocket. Experience has shown that it is desirable to add an additive such as boron to jet fuel in order to prolong the B.t.u. burning life of the fuel. It is, however, imperative that the supply of boron per unit volume not exceed a predetermined desired amount which would reduce the rate of burning of this fuel in the jet engine. If this latter condition should occur then the efficiency of the engine would be reduced. The present apparatus is thus very beneficial in detecting abnormal amounts of an undesired impurity such as boron or other additives as they are added to flow lines that are transmitting jet or other fuel to the engine of a missile or rocket.

If, for any reason, the intensity of the radiant energy source 12 should increase or decrease the apparatus disclosed herein will still, under either of these conditions, be able to make an accurate measurement of the fluid under test. This is possible because the ratio of the two radiant energy signals reaching the respective thermopiles 72 and 88 are always kept constant. Hence, any variation in the ratio of the two readings on the meters 78 and 94 will be an accurate measurement of the purity of the solution regardless of whether the light source 12 has increased or decreased.

If it is so desired to use only one meter to read this measured ratio a potentiometric circuit such as is disclosed in the Vollmer et al. application Serial No. 753,-570, filed August 6, 1958, should be used in lieu of the two meters 94, 78.

From the aforementioned description of the drawing it will be noted that a measuring apparatus is disclosed which is useful in detecting the instant of time in which certain strong absorption bands are absorbed by a continuously flowing process fluid in order that an impurity in the fluid that causes the existence of these bands can readily be detected.

What is claimed is:

1. Means for detecting the presence of an impurity in a continuously flowing fluid, comprising, a solid first and second elongated radiant energy conducting member, each having a first and second end and a peripheral side wall, a radiant energy emitting means for directing radiant energy at various angles into, through and out of each of said members, a first means for retaining a reference fluid of a preselected purity in contact with a first portion of said peripheral side wall of said first member, a second means for directing said flowing fluid into contact with a second portion of said peripheral side wall of said first member that is spaced from said first portion of said peripheral side wall, and radiant energy responsive means for measuring the radiant energy passing out of one end of each of said members wherein any difference in the ratio of said measurements of said responsive means reprents the presence of an undesired impurity in said continuously flowing fluid.

2. An apparatus to detect the occurrence of an impurity in a flowing fluid, comprising an electromagnetic radiant energy source to emit a broad band of frequencies extending through and on either side of the frequencies that are within the normal dispersion of a standard reference fluid and within the strong absorption bands of said impurity into a solid first and second radiant energy transmitting guide, a first means located adjacent said source to retain a standard pure solution in contact with a peripheral surface of said first guide, said radiant energy source being operably positioned to simultaneously transmit energy at said frequencies into through and out of said first guide and into through and out of said first guide into said standard pure solution, a second means located on the peripheral surface of said first guide at a greater distance from said source than said first means to retain said flowing fluid in contact with said peripheral surface of said guide and a measuring means responding to the energy of said remaining frequencies that have passed through said first and second guides to thereby provide a measurement of the presence of impurities in said flowing fluid.

3. An apparatus to detect the presence of an impurity in a fluid passing through a flow line, comprising two solid elongated members through which radiant energy can be transmitted, said members each having first and second ends and a peripheral side wall extending between the ends, a radiant energy source to emit radiant energy into one end of each member, said radiant energy being of a broad band of frequencies which include those that are strongly absorbed by said impurity in said fluid, a first jacket to retain a reference fluid in contact with an outer peripheral wall portion of one of said members, a second jacket to retain said fluid passing through said flow line in contact with another peripheral wall of said one of said members that is displaced longitudinally of said first mentioned wall portion and radiant energy responsive means for measuring the ratio of the radiant energy passing out of the other end of each of said members to afford a means that will indicate when a frequency band is strongly absorbed by the presence of an impurity in said fluid.

4. Means for detecting the presence of water in a continuously flowing process fluid containing alcohol, comprising a solid first and second elongated radiant energy conducting member each having a first and second end and a peripheral side wall, a radiant energy emitting means for directing radiant energy at various angles into through and out of each of said members, a first means for retaining alcohol of a preselected purity in contact with a first portion of said peripheral side wall of said first member, a second means for directing said flowing fluid containing water into contact with a second portion of said peripheral side wall of said first member that is spaced longitudinally from said first side wall, and radiant energy responsive means for measuring the radiant energy passing out of one end of each of said members wherein any difference in the ratio of said measurements of said responsive means represents the presence of the water in said continuously flowing fluid.

5. An apparatus to detect the occurrence of water in a flowing fluid, comprising an electromagnetic radiant energy source to emit a broad band of frequencies extending through and on either side of the frequencies that are within the normal dispersion of a standard reference fluid and within the strong absorption bands of said water into a solid first and second radiant energy transmitting guide, a first means located adjacent said source to retain a standard pure solution in contact with a peripheral surface of said first guide, said radiant energy source being operably positioned to simultaneously transmit energy at said frequencies into through and out of said first guide and into through and out of said first guide into said standard pure solution, a second means located on the peripheral surface of said first guide at a greater distance from said source than said first means to retain the flowing fluid containing water in contact with said peripheral surface of said guide and a measuring means responding to the energy of said remaining frequencies that have passed through said first and second guides to thereby provide a measurement of the presence of water in said flowing fluid.

6. Means for detecting the presence of an impurity in a continuously flowing fluid flowing through a reflux flow line, comprising a solid first and second elongated radiant energy conducting member each having a first and second end and a peripheral side wall, a radiant energy emitting means for directing radiant energy at various angles into through and out of each of said members, a first means for retaining a reference fluid of a preselected purity in contact with a first portion of said peripheral side wall of said first member, a second means for directing said flowing fluid in said reflux flow line into contact with a second portion of said peripheral side wall of said first member that is longitudinally spaced from said first side wall and radiant energy responsive means for measuring the radiant energy passing out of one end of each of said members wherein any difference in the ratio of said measurements of said responsive means represent the presence of an undesired impurity in said continuously flowing fluid.

7. An apparatus to detect the occurrence of an impurity in a flowing fluid passing through the reflux line of a distillation tower, comprising an electromagnetic energy source to emit a broad band of frequencies extending through and on either side of the frequencies that are within the normal dispersion of a standard reference fluid and strong absorption bands of said impurity into a solid first and second radiant energy transmitting guide, a first means located adjacent said source to retain a standard pure solution in contact with a peripheral surface of said first guide, said radiant energy source mean operably positioned to simultaneously transmit said frequencies into through and out of said first guide and into through and out of said first guide into said standard pure solution, a second means located on the surface of said first guide at a greater distance from said source than said first means to retain said flowing fluid passing through said reflux line in contact with said peripheral surface of said guide and a measuring means responding to the energy of said remaining frequencies that have passed through said first and second guides to thereby provide a measurement of the presence of impurities in said flowing fluid.

8. An apparatus to detect the presence of an impurity in a jet fuel fluid passing through a fuel flow line, comprising two solid elongated members through which radiant energy can be transmitted, said members each having first and second ends and a peripheral side wall extending between the ends, a radiant energy source to emit radiant energy into one end of each member, said radiant energy being of a broad band of frequencies which include those that are strongly absorbed by said impurity in said fluid, a first jacket to retain a reference jet fuel fluid in contact with an outer peripheral wall portion of one of said members a second jacket to retain said first mentioned jet fuel fluid passing through said flow line in contact with another peripheral wall of said one of said members that is displaced longitudinally of said first mentioned wall portion and radiant energy responsive means for measuring the ratio of the radiant energy passing out of the other end of each of said members to afford a means that will indicate when a frequency band is strongly absorbed by the presence of an impurity in said fluid.

9. An apparatus to detect the presence of water in a jet fuel fluid passing through a fuel flow line, comprising two solid elongated members through which radiant energy can be transmitted, said members each having first and second ends and a peripheral side wall extending between the ends, a radiant energy source to emit radiant energy into one end of each member, said radiant energy being of a broad band of frequencies which include those that are strongly absorbed by said water, a first jacket to retain a reference jet fuel fluid in contact with an outer peripheral wall portion of one of said members, a second jacket to retain said first mentioned jet fuel fluid passing through said flow line in contact with another peripheral wall of said one of said members that is displaced longitudinally of said first mentioned wall portion and radiant energy responsive means for measuring the ratio of the radiant energy passing out of the other end of each of said members to afford a means that will indicate when a frequency band is strongly absorbed by the presence of water in said fluid.

10. An apparatus to detect the presence of an additive in a jet fuel fluid passing through a fuel flow line, comprising two solid elongated members through which radiant energy can be transmitted, said members each having first and second ends and a peripheral side wall extending between the ends, a radiant energy source to emit radiant energy into one end of each member, said radiant energy being of a broad band of frequencies which include those that are strongly absorbed by said additive, a first jacket to retain a reference jet fuel fluid in contact with an outer peripheral wall portion of one of said members, a second jacket to retain said first mentioned jet fuel fluid passing through said flow line in contact with another peripheral wall of said one of said members that is displaced longitudinally of said first mentioned wall portion and radiant energy responsive means for measuring the ratio of the radiant energy passing out of the other end of each of said members to afford a means that will indicate when a frequency band is strongly absorbed by the presence of said additive in said fluid.

11. An apparatus to detect the presence of boron in a jet fuel fluid passing through a fuel flow line, a comprising two solid elongated members through which radiant energy can be transmitted, said members each having first and second ends and a peripheral side wall extending between the ends, a radiant energy source to emit radiant energy into one end of each member, said radiant energy being of a broad band of frequencies which include those that are strongly absorbed by said boron, a first jacket to retain a reference jet fuel fluid in contact with an outer peripheral wall portion of one of said members, a second jacket to retain said first mentioned jet fuel fluid passing through said flow line in contact with another peripheral wall of said one of said members that is longitudinally displaced from said first mentioned wall portion and radiant energy responsive means for measuring the ratio of the radiant energy passing out of the other end of each of said members to afford a means that will indicate when a frequency band is strongly absorbed by the presence of boron in said fluid.

References Cited in the file of this patent

UNITED STATES PATENTS

| | | |
|---|---|---|
| 2,431,019 | Barnes | Nov. 18, 1947 |
| 2,569,127 | Eltenton | Sept. 25, 1951 |
| 2,721,942 | Friel et al. | Oct. 25, 1955 |

OTHER REFERENCES

Taylor et al.: "Studies in Refractive Index III," Journal of the Optical Society of America, vol. 23, August 1933, No. 8, pages 263–269.

Jenkins and White: Fundamentals of Optics, third edition, 1957, McGraw-Hill Book Co., Inc., New York, pages 468–472.